Figure 1:
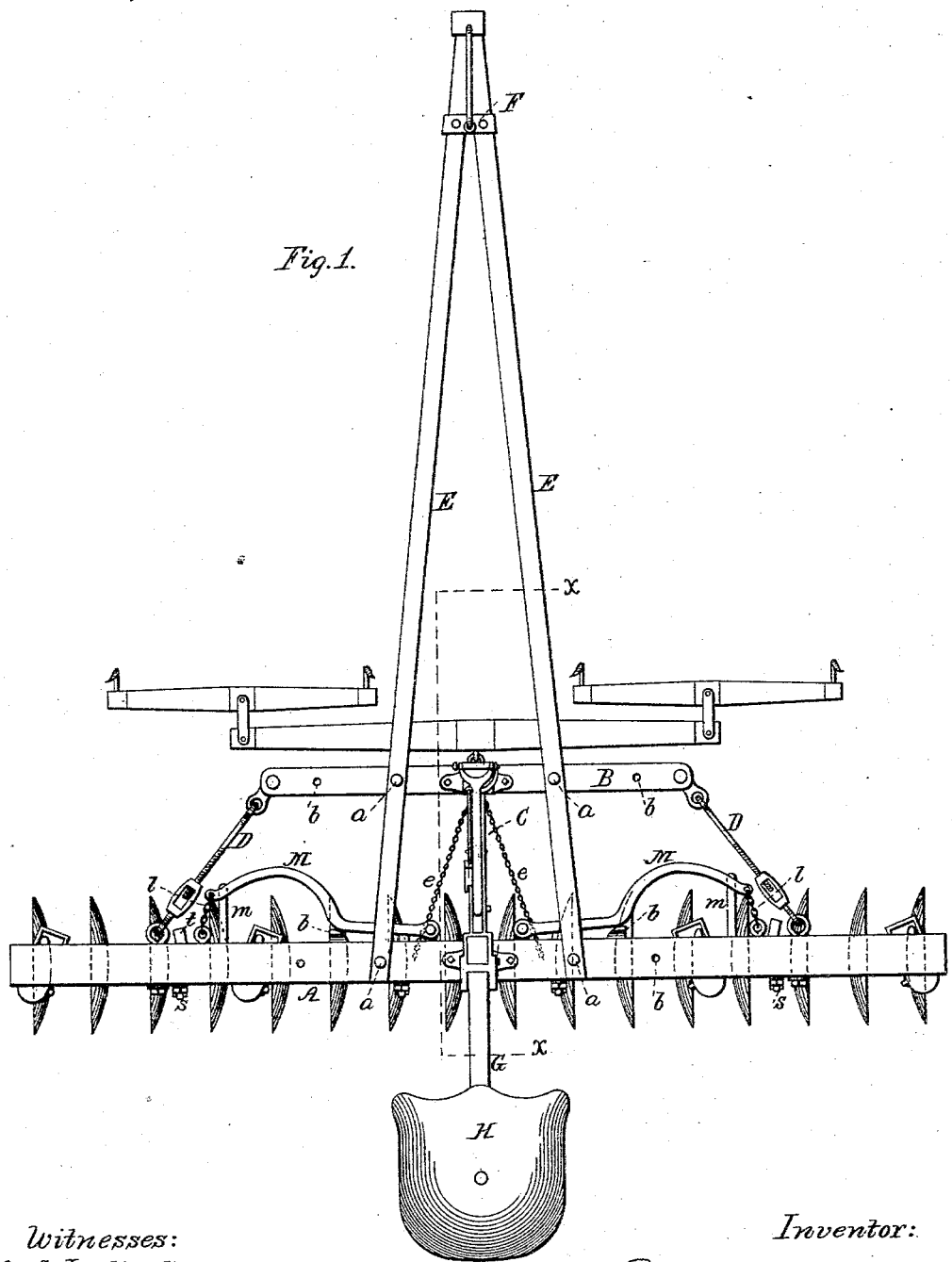

(No Model.)  6 Sheets—Sheet 1.

E. F. STODDARD, Dec'd.
H. C. Lowe, Administrator.
HARROW.

No. 369,300.  Patented Aug. 30, 1887.

Witnesses:
W. C. Firdinston.
Edward W. Rector

Inventor:
E. Fowler Stoddard
by Stem Peck
his Attorneys.

(No Model.)
E. F. STODDARD, Dec'd.
H. C. LOWE, Administrator.
HARROW.
No. 369,300. Patented Aug. 30, 1887.
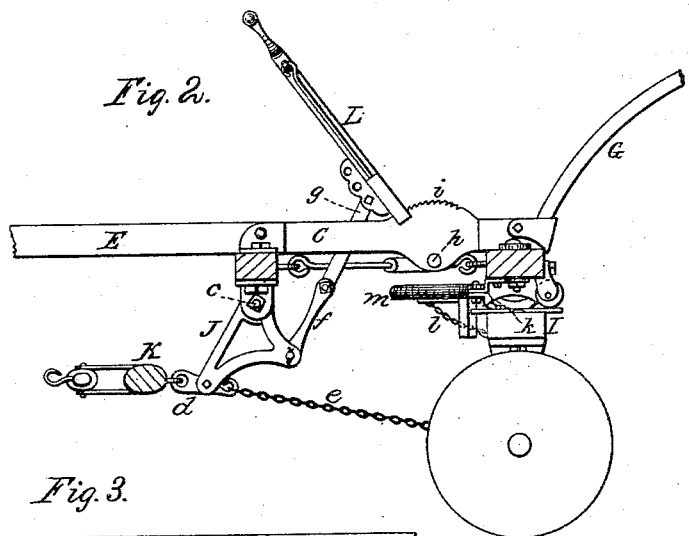
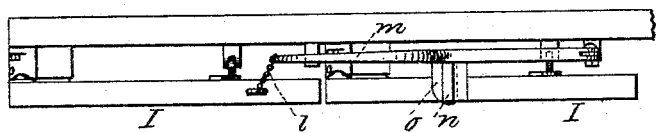
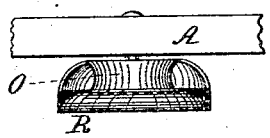
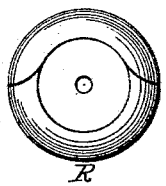
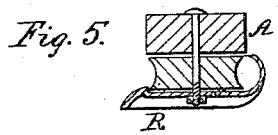
Witnesses:
W. C. Jirdinston.
Edward W. Rector.
Inventor:
E. Fowler Stoddard
by Stems Peck
his Attorneys.

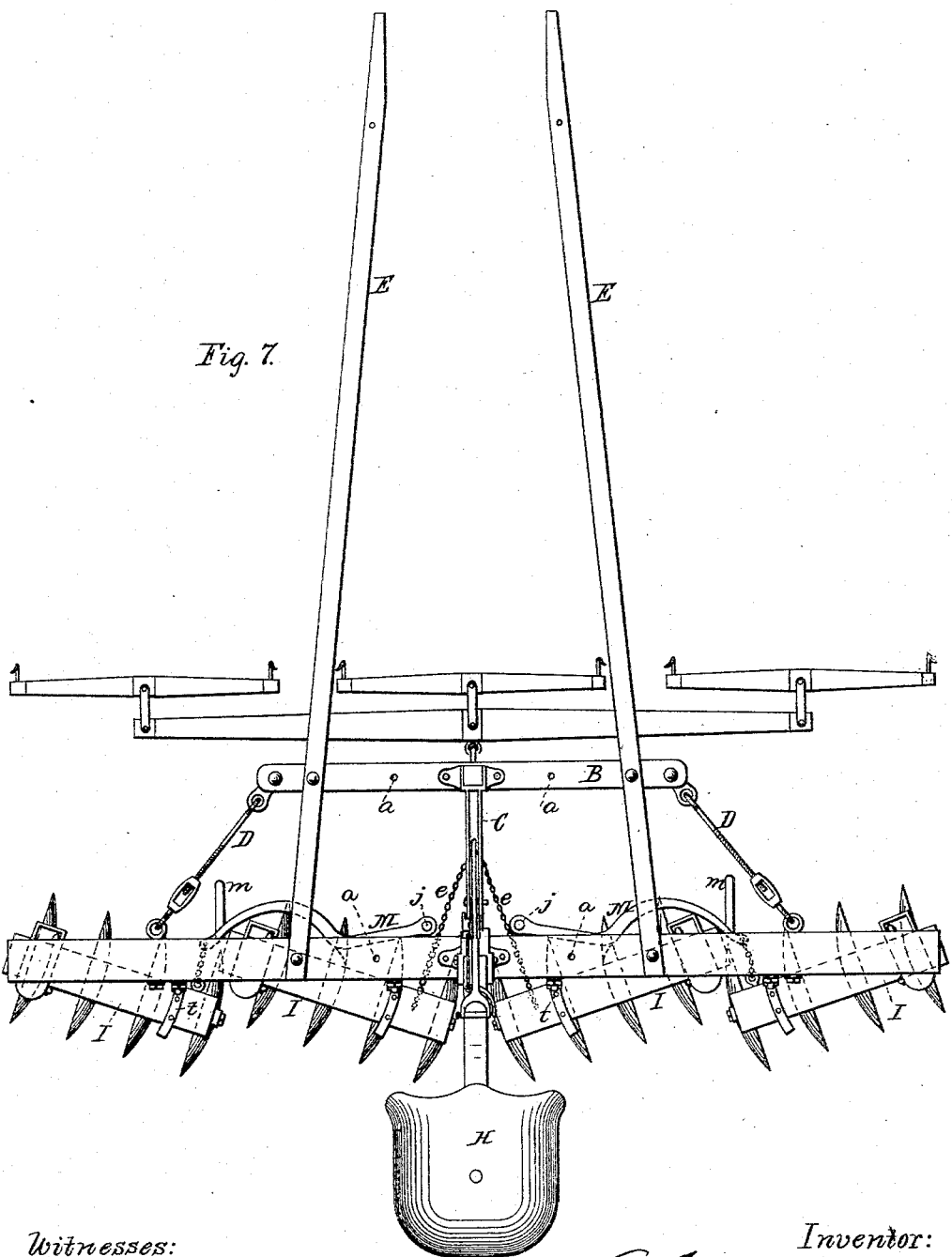

(No Model.) 6 Sheets—Sheet 4.

E. F. STODDARD, Dec'd.
H. C. Lowe, Administrator.
HARROW.

No. 369,300. Patented Aug. 30, 1887.

Witnesses:
W. C. Jirdinston.
Edward W. Rector.

Inventor:
E. Fowler Stoddard
by Stem & Peck
his Attorneys.

(No Model.) 6 Sheets—Sheet 5.

E. F. STODDARD, Dec'd.
H. C. Lowe, Administrator.
HARROW.

No. 369,300. Patented Aug. 30, 1887.

Witnesses:
W. C. Jirdinston.
Edward W. Rector

Inventor:
E. Fowler Stoddard
by Stem & Peck
his Attorneys.

(No Model.) 6 Sheets—Sheet 6.

E. F. STODDARD, Dec'd.
H. C. LOWE, Administrator.
HARROW.

No. 369,300. Patented Aug. 30, 1887.

Witnesses:
W. C. Jirdinston:
Edward W. Rector

Inventor:
E. Fowler Stoddard
by Stem Beck
his Attorneys.

UNITED STATES PATENT OFFICE.

E. FOWLER STODDARD, OF DAYTON, OHIO; HENRY C. LOWE (ADMINISTRATOR OF E. FOWLER STODDARD, DECEASED) ASSIGNOR TO THE STODDARD MANUFACTURING COMPANY, OF SAME PLACE.

HARROW.

SPECIFICATION forming part of Letters Patent No. 369,300, dated August 30, 1887.

Application filed September 27, 1886. Serial No. 214,588. (No model.)

*To all whom it may concern:*

Be it known that I, E. FOWLER STODDARD, a citizen of the United States, residing at Dayton, in the county of Montgomery and State of Ohio, have invented certain new and useful Improvements in Harrows, of which the following is a full, clear, and exact description, reference being had to the accompanying drawings, forming a part of this specification.

My invention relates to that class of harrows or cultivators known as "rotary-disk" harrows, in which gangs of disks, preferably concavo-convex disks, are employed in sets adjustably connected to the main frame in such manner that all of the sets may be used in a continuous straight line or in an angling position. It has for its object such an organization of the machine that multiple sets of disk-gangs may be employed on each side of the center, thereby increasing the width of the harrow, the number of disks, and the efficiency of the machine; also, such a connection between the gangs that they are operated by the power of the team simultaneously, both in changing from a straight line to an angling position, and vice versa, and to any degree of angling desired. It also has for its object such an organization that the harrow may be converted from a one-horse harrow to a three-horse harrow, with two or more disk-gangs on each side, and wherein the draft-power is perfectly equalized; and, finally, the general improvement in the construction of this class of machines.

The novelty of my invention will be herein set forth, and specifically pointed out in the claims.

Figure 8:
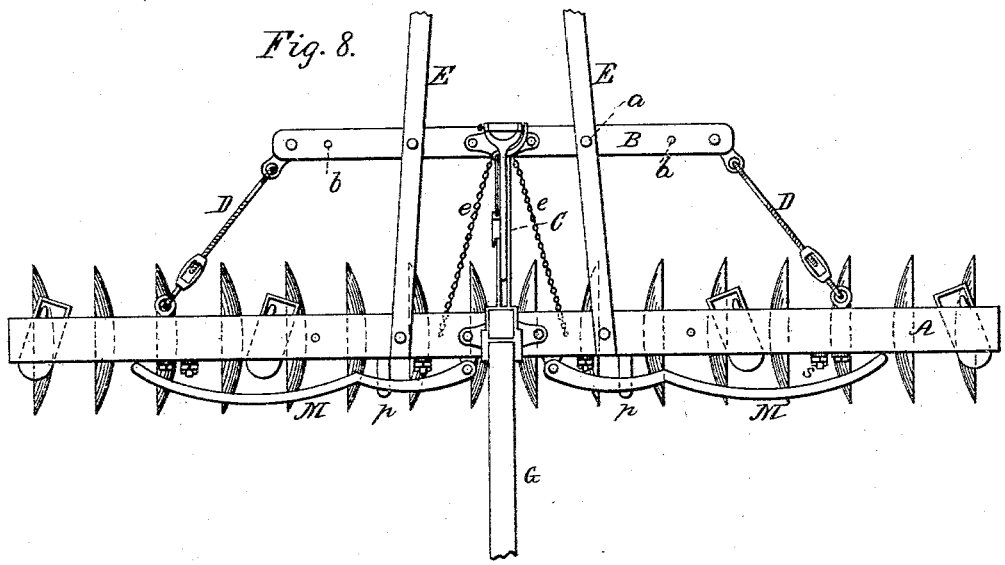
Figure 9:
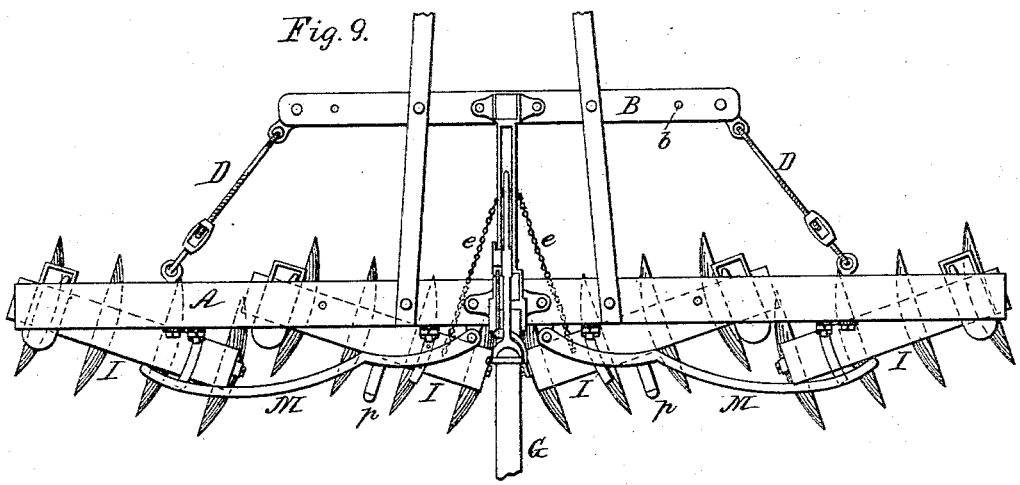
Figure 10:
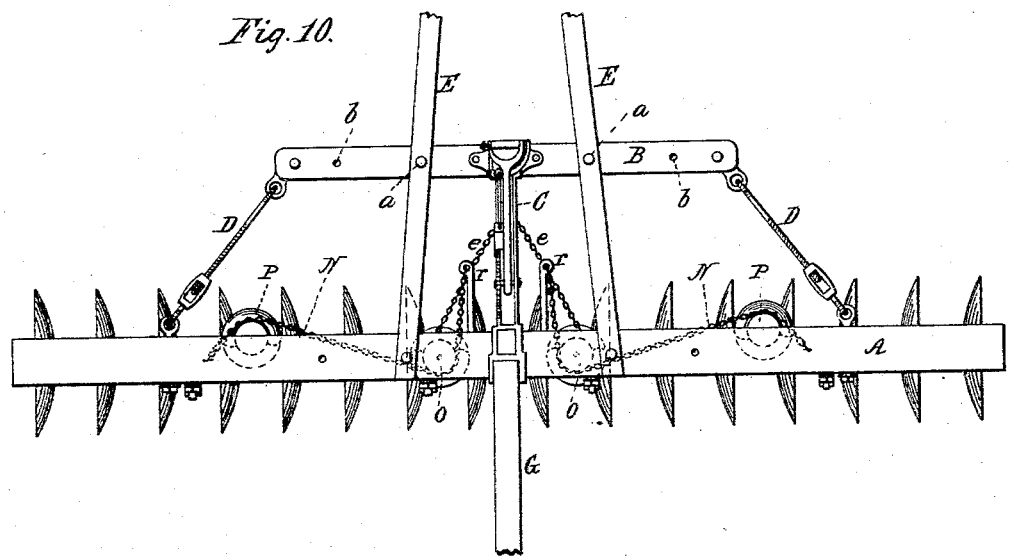
Figure 11:
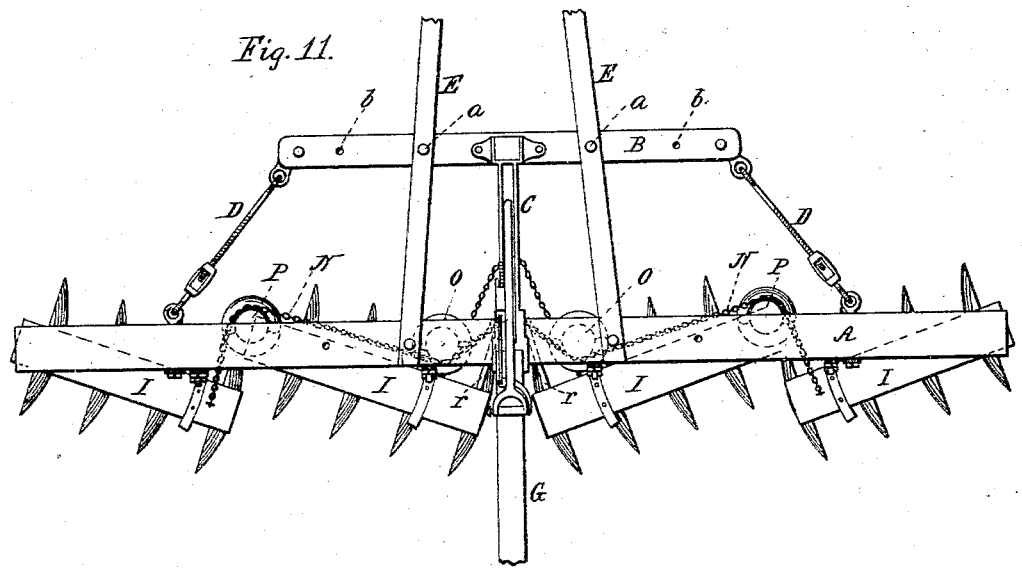
Figure 12:
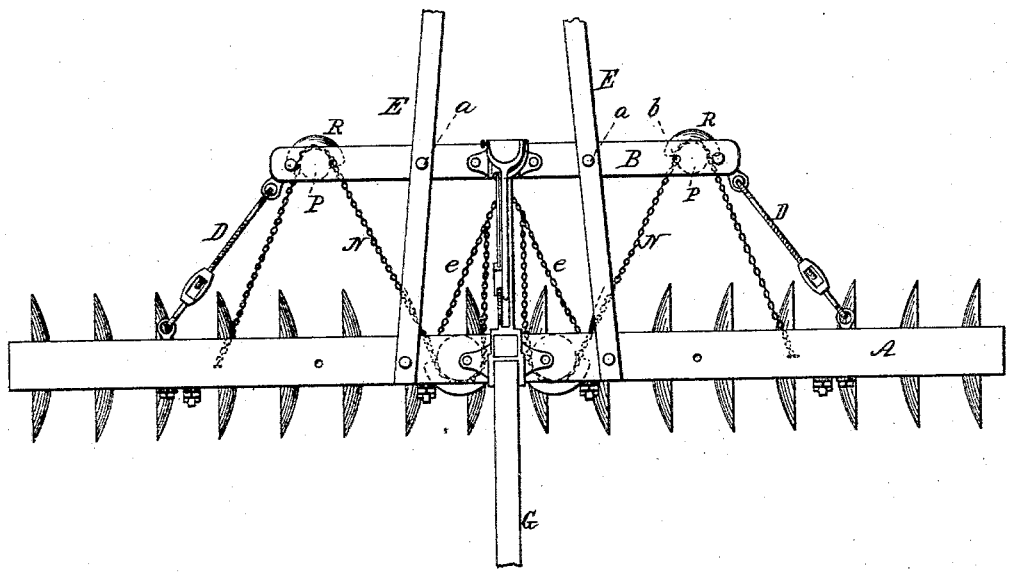
Figure 13:
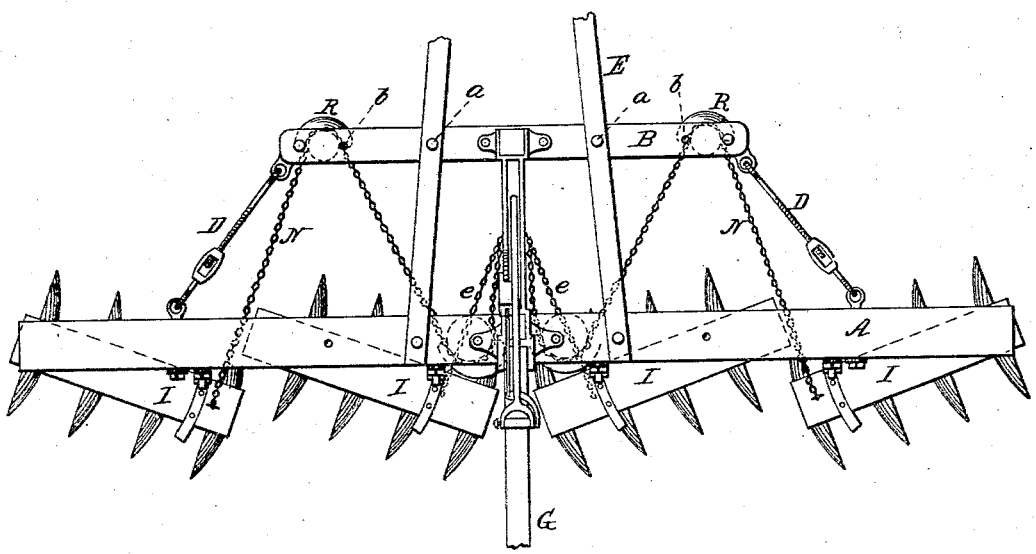

In the accompanying drawings, Figure 1, Sheet 1, is a plan view of a harrow embodying my present invention, with the gangs in a straight line and arranged for two horses. Fig. 2, Sheet 2, is a sectional side elevation of the same through the line $x\ x$ of Fig. 1. Fig. 3, Sheet 2, is a front elevation of one-half of the main beam, with two gang-beams connected thereto. Figs. 4, 5, and 6, Sheet 2, are enlarged detail views of the sheaves and chain-guides, showing their arrangement and mode of connection to the main beam. Fig. 7, Sheet 3, is a plan view of the harrow arranged for three horses, and with the disk-gangs angled. Fig. 8, Sheet 4, is a plan view representing a modification in the construction, and with the gangs in line. Fig. 9, Sheet 4, is a corresponding view with the gangs angling. Fig. 10, Sheet 5, is a plan view representing a further modification in the construction, and with the gangs in line. Fig. 11, Sheet 5, is a corresponding view of the same with the gangs angling. Fig. 12, Sheet 6, is a plan view representing a still further modification in the construction, and with the gangs in line. Fig. 13, Sheet 6, is a corresponding view of the same with the gangs angling.

The same letters of reference are used to indicate identical parts in all the figures.

The main frame of the harrows is composed of the main beam A, a forward cross-beam, B, united to the main beam by a central brace, C, and end braces, D, and the combined pole and thills, composed of the two shafts E E, bolted to the bar B and main beam A at their rear ends, as at $a$, Fig. 1, and having their converging forward ends united by any suitable removable yoke-iron, F, to constitute the pole, and disconnected at their forward ends and bolted through the holes $b$ of the main beam and bar B to constitute thills, as shown in Fig. 7.

G is any suitable seat-beam secured to the main beam and supporting the driver's seat H.

The disk-gangs, each containing in this instance four disks, are of the usual or any suitable construction, and their beams I are hinged to the under side of the main beam, each at or near its outer ends, and preferably by the means shown and described in my prior pending application, Serial No. 150,389, filed December 15, 1884, whereby a universal joint is secured.

To cause the gangs on each side to be shifted simultaneously, I employ the swinging arm J, Fig. 2, which, hinged as at $c$, to the under side of the bar B, or at any other convenient point, has the doubletree K secured to its lower end by means of a hitch-link, $d$, from the rear hooked end of which chains $e$ extend back to and are connected to the inner or adjacent ends of the inner disk-gangs, either by connection with the gang-beams themselves, or, as shown in Fig. 2, to the boxes of the inner hangers.

The arm J has a rearward extension, forming a bell-crank, which is connected by pivoted links $f\,g$, or by a chain, if preferred, to a lock-lever, L, which, pivoted, as at $b$, in or to the center brace, C, engages with a segment rack or ratchet, $i$, to hold the arm J locked from forward movement in any of its adjusted positions. This construction alone would permit of the simultaneous adjustment, by the forward draft of the team and the resistance of the earth, of the inner gangs only; and to obtain the simultaneous adjustment of the outer gangs with the two inner gangs I provide the following means, reference being had to the Figs. 1, 2, 3, and 7:

An arm, M, is provided for each of the outer gangs, each of which arms is pivoted, as at $j$, to a bracket, $k$, secured to the under side of the main beam. The shape of these arms, as illustrated, is such as to clear the hinges of the inner gangs. Their outer ends extend over in front of the inner ends of the outer gang-beams and are connected thereto by chains $l$. They each rest at or near their outer ends upon guide-supports $m$, secured to the under side of the main beam. At or about midway of said arm, at a point about opposite the middle of the inner gang-beam, is a pendent lug, $n$, which comes in contact with an upwardly-extending lug, $o$, secured to the gang-beam.

It will be seen from this construction and from the relative arrangement of the parts that when the inner gangs are in straight line the arms M will be so thrown forward, as seen in Fig. 1, as to hold the outer gangs likewise in a straight line with the inner gangs; also, that whenever the team is backed sufficiently to permit the lever L to be drawn back and locked—say at its farthest limit of adjustment—the chains $e$ are sufficiently slacked to permit the inner gangs, through the resistance of the earth on them when the machine is again started, to fall back to an angling position, as seen in Fig. 7. This falling back of the inner gangs permits the arms M also to fall back and the outer gangs, through the resistance of the earth, to assume an angling position simultaneously with the inner gangs.

By unlocking the lever L the draft of the team is transmitted directly from the doubletree through the chain $e$ to the inner ends of the inner gangs, thereby drawing the same forward to a straight line, and at the same time, by their forward travel, pushing the arms M forward, and, through the medium of the chains $l$, drawing forward the outer gangs to a straight line, thus giving to both sets of gangs a corresponding and simultaneous movement, as will be readily understood.

As a modification of this construction, reference is made to Figs. 8 and 9, where the arms M are pivoted at the rear of the main beam and act upon the rear side of the gang-beams. In this construction the outer ends of the arm M are bent downward to engage with the rear side of the outer gang-beams, and the inner gang-beams are provided with upwardly-extending hooks $p$, which engage with the outer side of the arms M. The result in shifting the gangs is substantially the same, the only difference being that the outer gangs are pushed forward to a straight line instead of being pulled forward.

A further modification to accomplish the same result is illustrated in Figs. 10 and 11, where, instead of the arms M, chains N are employed to connect the two gang-beams on each side. The inner end of each chain is secured to a projecting arm, $r$, attached to the inner ends of the inner gang-beams, extends back around a sheave, O, pivoted to the under side of the main beam, thence outwardly around the front of a second sheave, P, and thence back to the inner end of the outer gang-beam, to which they are secured.

It will be readily seen from this construction that as the inner gangs swing backward sufficient slack is given the chains N to permit the outer gangs to likewise swing back, and also that the drawing forward of the inner gangs causes the drawing forward of the outer gangs by the taking up of the slack before referred to.

By reference to Figs. 4, 5, and 6 the construction and mode of application of the sheaves will be clearly seen, and to prevent the accidental disengagement of the chain from the sheaves I have provided the guide-flanges R, into which the bottoms of the sheaves are partially recessed, which guide-flanges are secured by the same bolt that serves as a journal for the sheave.

A still further modification is illustrated in Figs. 12 and 13, where the sheaves P are transferred from the under side of the main beam to the under side of the cross-bar B, and the chains N, instead of being fastened at their forward ends directly to the inner gang-beams or forward extensions thereof, are secured directly to the chains $e$, or may be carried forward and secured independently to the hitch-link.

It will be seen from the foregoing description that by connecting an outer gang with the next inner gang on the same side I am not limited in the number of gangs employed on each side, except by the ability of the team to draw the machine; also, that when it is desired to use this harrow as a one-horse machine, the outer gangs can be removed entirely and the horse be hitched between the shafts, as in Fig. 7. Again, when it is desired to use two horses, the pole arrangement of the shafts E shown in Fig. 1 may be employed, and by sufficiently lengthening the chains $e$ and securing their rear ends to the inner ends of the outer gangs the inner gangs may be removed from the machine and the same be used as a straddle-row cultivator. Still again, when in heavy soil it is desired to employ three horses, the arrangement of the parts shown in Fig. 7 is employed, in which one horse would stand between the shafts at the center of the machine and the others on the outer side and abreast of him, thereby securing an even and equal draft.

Such as I have described may be either a flexible or a rigid harrow, and to avoid friction between the gang-beams and the main beam I interpose anti-friction-rollers $s$, which travel upon segment-plates $t$, as shown.

It will of course be readily understood that instead of connecting the doubletree or hitching-point to a swinging arm it may be made to slide upon the under side of the center brace, C, or an extension thereof, substantially as illustrated in my Patent No. 312,772, of February 24, 1885.

Having thus fully described my invention, I claim—

1. In a wheel or disk harrow, the combination, with the main frame, of two or more sets of disk-gangs hinged or pivoted thereto on each side of its center, and connecting mechanism whereby the power of the team effects the simultaneous shifting of said disk-gangs from a straight line to an angling position, and vice versa, substantially as described.

2. In a wheel or disk harrow, the combination, with the main frame, of two or more sets of disk-gangs hinged or pivoted thereto on each side of its center, and connecting mechanism whereby the power of the team effects the simultaneous shifting of said disk-gangs from a straight line to an angling position, and vice versa, and whereby the shifting of one gang causes the simultaneous shifting of its adjacent connected gang, substantially as described.

3. In a wheel or disk harrow, the combination, with the main frame, of two or more sets of disk-gangs hinged or pivoted thereto on each side of its center, and connecting mechanism whereby the power of the team effects the simultaneous shifting of said disk-gangs from a straight line to an angling position, and vice versa, and whereby the shifting of an inner gang causes the simultaneous shifting of its adjacent outer gang, substantially as described.

4. In a wheel or disk harrow, the combination, with the main frame and two or more sets of disk-gangs hinged or pivoted thereto on each side of its center, of an independent backwardly and forwardly movable doubletree and connecting mechanism, whereby the power of the team effects the simultaneous shifting of said disk-gangs from a straight line to an angling position, and vice versa, substantially as described.

5. In a wheel or disk harrow, the combination, with the main frame and two or more sets of disk-gangs hinged or pivoted thereto on each side of its center, of an independent backwardly and forwardly movable doubletree and connected mechanism, whereby the power of the team effects the simultaneous shifting of said disk-gangs from a straight line to an angling position, and vice versa, and whereby the shifting of one gang causes the simultaneous shifting of its adjacent connected gang, substantially as described.

6. In a wheel or disk harrow, the combination, with the main frame and two or more sets of disk-gangs hinged or pivoted thereto on each side of its center, of an independent backwardly and forwardly movable doubletree and connecting mechanism, whereby the power of the team effects the simultaneous shifting of said disk-gangs from a straight line to an angling position, and vice versa, and whereby the shifting of the inner gangs causes the simultaneous shifting of the outer gangs, substantially as described.

7. In a wheel or disk harrow, the combination, with the main frame and two or more sets of disk-gangs hinged or pivoted thereto on each side of its center, with connecting mechanism, of an independent backwardly and forwardly movable doubletree and adjusting and locking mechanism, whereby the power of the team effects the simultaneous shifting of said disk-gangs from a straight line to an angling position, and vice versa, and whereby said disk-gangs can be locked in any of their adjusted positions, substantially as described.

8. In a wheel or disk harrow having two or more sets of disk-gangs on each side of its center, chains connecting the beams of said gangs on each side and passed around sheaves journaled to the main frame, substantially as described, whereby the shifting of the inner gangs causes the simultaneous shifting of the outer gangs.

9. In a wheel or disk harrow, the combination, with the main frame and convertible poles and thills secured thereto, of backwardly and forwardly movable hitching mechanism, substantially as described, whereby a perfect center draft is obtained whether two or three horses are used.

10. In a wheel or disk harrow, the combination, with the main frame and adjustable disk-gangs hinged thereto, of convertible pole and thills secured to the main frame and hitching mechanism, whereby a perfect center draft is obtained whether an odd or an even number of horses abreast are hitched thereto.

E. FOWLER STODDARD.

Witnesses:
NELSON M. MAYER,
GEORGE HEIDMAN.